United States Patent [19]

Makino

[11] Patent Number: 4,840,211

[45] Date of Patent: Jun. 20, 1989

[54] PNEUMATIC TIRE HAVING ASYMMETRICAL GROOVE CROSS SECTION

[75] Inventor: Shigeo Makino, Saitama, Japan

[73] Assignee: Bridgestone Corporation, Japan

[21] Appl. No.: 63,894

[22] Filed: Jun. 19, 1987

[30] Foreign Application Priority Data

Jun. 20, 1986 [JP] Japan .................................. 61-144058

[51] Int. Cl.$^4$ .............................................. B60C 11/06
[52] U.S. Cl. .................................................. 152/209 R
[58] Field of Search ........ 152/209 R, DIG. 1, 209 A, 152/208 D, 209 B

[56] References Cited

U.S. PATENT DOCUMENTS

| 2,604,920 | 7/1952 | Kirby | 152/209 R |
| 2,637,362 | 5/1953 | Briscoe et al. | 152/209 R |
| 2,843,172 | 7/1958 | Berry et al. | 152/209 R |

FOREIGN PATENT DOCUMENTS

| 0962034 | 9/1982 | U.S.S.R. | 152/209 R |
| 2100200 | 12/1982 | United Kingdom | 152/209 R |

Primary Examiner—Robert A. Dawson
Assistant Examiner—Geoffrey L. Knable
Attorney, Agent, or Firm—Sughrue, Mion, Zinn, Macpeak & Seas

[57] ABSTRACT

A main circumferential groove for a pneumatic tire having asymmetrical side walls. One of the side walls has three segments each inclined differently to a line normal to the tread surface. The angle of the inner segment is larger than that of an outer segment.

12 Claims, 1 Drawing Sheet

PNEUMATIC TIRE HAVING ASYMMETRICAL GROOVE CROSS SECTION

BACKGROUND OF THE INVENTION

1. Field of the Invention

This invention relates to pneumatic tires. In particular it relates to an improvement in shape of a main circumferential groove in a pneumatic tire for use in vehicles such as trucks, buses, and the like, that run on both paved roads and gravel roads.

2. Description of the Prior Art

Generally, a main groove in a tread of a pneumatic tire for use in vehicles such as trucks, buses, and the like, is made deep to prolong the wear life of the tire. The width of the main groove is restricted to be less than a predetermined limit to provide sufficient rubber to be worn during the life of the tire. Therefore, there is a problem in the sectional shape of the main groove since the groove depth is deep and the groove angle is small for the groove width. Such a groove is apt to seize and retain stones. The larger the ratio of the groove width W to the depth H (W/H), the possibility of stone seizing by the groove is decreased. However, if the groove depth is made deeper with ratio W/H kept constant, the groove width becomes wide, so that the amount of rubber to be worn out is decreased thus reducing the lifetime of the tire. Accordingly, the ratio W/H of groove width to the depth is in prior art tires generally selected to be about 0.5 -0.8.

Conventionally, as illustrated in FIGS. 2 and 3 for example, a pneumatic tire 6 has a main groove 1 having a substantially U-shaped section and circumferentially formed in an outer surface region 2a of a tread 2. Each of the opposite side wall surfaces 3 of the main groove 1 is slanted to form an angle $\alpha_1$ of, for example, 13 degrees with a normal line 5 perpendicular to an outer surface 2b of the tread 2.

However, when the pneumatic tire 6 having such a main groove 1 is driven on a road 7 where pieces of stone 9 are scattered, the opening of the groove 1 is widened at a side 8a of the tire 6 (FIG.. 3) to seize the stone 9. The stone 9 once seized in the main groove 1 is pushed further into the main groove 1 at a portion just below portion of a load 8b. It is thus urged into the main groove 1 between the wall surfaces 3 thereof, so that even after the main groove 1 rotates away from a road surface 7, a large retaining force $F_1$ is exerted onto the stone 9 at the outer surface 2b of the tread 2. This is illustrated in FIG. 4. The force $F_1$ prevents the stone 9 from being discharged from the main groove 1.

FIG. 5, illustrated another pneumatic tire provided with a main groove 11 in which each of the opposite side walls of the groove 11 are inclined at compound angles in an opening portion 11a of the groove 11. Two side wall angles $\alpha_1$ and $\alpha_2$ formed between a side groove wall surface 12 at the opening portion 11a and a normal line 5. The angle $\alpha_2$ is about 25 degrees. In such a main groove 11 having such an opening portion 11a, the groove 11 does not readily seize a stone because of the enlarged opening of the groove. However, when a stone is pushed into an inner portion of the groove from the opening, the stone is pushed farther into the inner portion of the main groove 11. The stone cannot be discharged from the groove because a fastening force is exerted onto the stone from the wall surfaces as in the case of the main groove 1 of the conventional tire as described with reference to FIGS. 2-4. There is therefore a problem that if the groove is formed with the groove wall angle at the opening portion 11a as illustrated, the groove depth becomes so shallow that the life of the tire is reduced. That is, there is an inverse relationship between the groove depth and the stone-seizing characteristic of the groove. Also, as the tire wears, when the tread gauge 22 is reduced, the groove depth decreased eliminating walls 12 and angle $\alpha_2$. The groove 3 is then identical to FIG. 2.

BRIEF SUMMARY OF THE INVENTION

An object of the present invention is therefore to eliminate drawbacks in the prior art pneumatic tires.

Another object of the present invention is to provide a pneumatic tire in which the depth of the main groove is deep to prolong the life of the tire yet having the main groove with a shape to reduce the tendency for stone-seizing.

To attain the above objects, according to one aspect of the present invention, the pneumatic tire has at least one main wide groove substantially circumferentially extending in a tread of the tire and having opposite side walls, at least one of the side walls being composed of an outer region located at a radially outer portion of the one side wall, an inner region located at a radially inner portion of the one side wall, and an intermediate region located between the inner and outer regions, groove wall angles formed between a normal line perpendicular to an outer surface of the tread and respective surface portions of the one side wall in the outer and inner regions are selected to be larger than a groove wall angle formed between the normal line and a surface portion of the one side wall in the intermediate region.

Preferably, each of the respective groove wall angles in the inner and outer regions of the main groove is selected within a range of 20 to 40 degrees. The reason why the groove angle in the outer region is selected within such a range is as follows. When the angle is selected to be smaller than 20 degrees, the groove is apt to seize a piece of stone, conversely, when the angle is selected to be larger than 40 degrees, an effective shape of the main groove cannot be obtained but also the groove wall angle in the inner region of the groove becomes small if the groove width is limited. A stone is then apt to be urged farther into the inner portion of the groove.

Preferably, the groove wall angle in the inner region of the main groove is selected to be larger than that in the outer region. This is because the inner region having a larger groove wall angle acts to prevent a stone from being urged farther into the groove and to discharge a stone pushed into the inner region.

Further, preferably, the intermediate region of the side wall of the main groove includes a central zone of the groove depth, with the height of the intermediate region within a range of from 15 to 35% of the entire groove depth. The groove wall angle in the intermediate region of the side wall of the main groove is selected to be within a range of from 0 to 10 degrees, preferably from 0 to 5 degrees. It is important to provide the intermediate region as a portion of the groove. This is because the intermediate region makes it possible to have the groove wall angle in the outer region large so that the groove will not grab stones and also to make the groove wall angle in the inner region large. Preferably, the groove wall angle in the inner, region is selected to be larger than that in the outer region, to effectively prevent stones from cutting into the rubber in the groove bottom. That is, the above-mentioned conflicting design constraints can be solved simultaneously by this invention.

In the pneumatic tire according to the present invention, since at least one of opposite side walls of the circumferentially formed groove is composed of the outer region, the intermediate region, and the inner region, in this order in the direction from the radial outer surface of the tire, and because of the provision of the intermediate region formed in radially intermediate portion of the groove, it is possible to make large the angles of the respective side walls in the outer and inner regions independent of each other to prevent stones from being seized and to make the length of the intermediate range longer to secure the entire depth of the groove. Furthermore, since the angle formed between the normal line perpendicular to the tread surface and each of the side wall surface portions in the outer and inner regions is larger than the angle formed between the normal line and the side wall surface portion in the intermediate region, the tire will not seize stones even when the tire is driven on a road. Accordingly, in the pneumatic tire according to the present invention, the main groove can be made deeper with the groove width maintained at a predetermined value while preventing stones from being grabbed by the 2nd and retained in the groove.

DESCRIPTION OF PREFERRED EMBODIMENT

A preferred embodiment of the present invention will be described hereunder with reference to the drawings.

Figure 1:
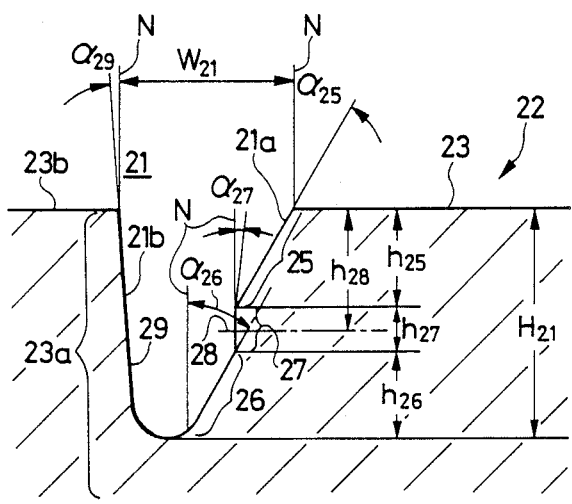
FIG.1 is a sectional view illustrating a main groove portion of an embodiment of the pneumatic tire according to the present invention.
Figure 3:
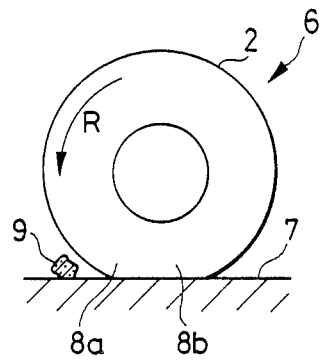
FIG.3 is a side view explaining the state of stone-seizing in the conventional pneumatic tire of FIG.2.
Figure 4:
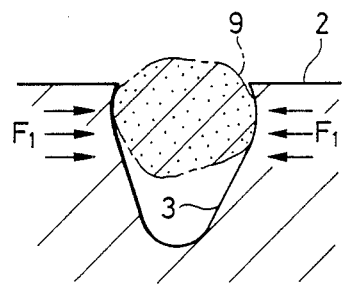
FIG. 4 is a section showing the main portion similar to FIG. 2 for explaining the state of stone-seizing.

FIG.1 illustrates an embodiment of the pneumatic tire according to the present invention. A main groove 21 is circumferentially provided in an outer surface 23a of a tread 23 of a tire 22. For purposes of illustration, the tire can be a steel belted radial tire, the size thereof 11R22.5. A side wall 21a, one of the side walls of the main groove 21, is composed of an outer wall 25 located at a radially outer portion, an inner wall 26 located at a radially inner portion, and an intermediate wall 27 located between the inner wall 26 and the outer wall 25. In the main groove 21, the depth $H_{21}$ and width $W_{21}$ are selected to be 23 mm and 16 mm respectively, and the heights $h_{25}$, $h_{26}$ and $h_{27}$, in the radial direction, of the outer, inner and intermediate regions are selected to be 8 mm, 8 mm and 7 mm respectively. These dimensions are preferred for the 11R22.5 tire. The ratio of width to depth may be in the range of 0.5–0.8. The intermediate region is provided to cross a substantially central position of the groove depth $H_{21}$, that is, a position having a height $h_{28}$ in radial direction which is selected to be 11.5 mm from a surface 23b of the tread 23 (i.e. $H_{28}=0.5H_{21}$).

Let $\alpha_{25}$, and $\alpha_{26}$, and $\alpha_{27}$ be the respective groove wall angles between the line N perpendicular to the surface 23b of the tread 23 and respective side wall surfaces 25, 26, and 27 of the outer, inner, and intermediate regions. The groove wall angles $\alpha_{25}$, $\alpha_{26}$ and $\alpha_{27}$ are selected to be 32 degrees, 37 degrees and 3 degrees respectively. Thus, each of the respective groove wall angles $\alpha_{25}$, $\alpha_{26}$ of the outer and inner walls 25 and 26 is larger than the groove wall angle $\alpha_{27}$ of the intermediate wall 27, and falls within the range of from 20 to 40 degrees. Further, the groove wall angle $\alpha_{26}$ of the inner wall 26 (37 degrees) is larger than the groove wall angle $\alpha_{25}$ of the outer wall 25 (32 degrees). Furthermore, the groove wall angle $\alpha_{29}$ between the normal line N and a wall surface 29 of the other side wall 21b of main groove 21 is selected to be 5 degrees. Thus the angle $\alpha_{27}$ is substantially equal to $\alpha_{29}$.

The pneumatic tire of this embodiment has the same structure as that of conventional pneumatic steel radial tires with the exception of the main groove illustrated in FIG.1 and described herein. The description of the remaining portions of the tire is omitted.

Next, the operation of the main groove will be described.

In the pneumatic tire according to the present invention, the main groove 21 has three regions defined by the side walls, that is, the outer region, the inner region, and the intermediate region. Since the groove wall angle $\alpha_{27}$ of the intermediate wall 27 is so small that the side wall surface 27 is substantially parallel to the normal line N, it is possible to make the groove wall angles of the outer and inner regions as well as the groove depth large without increasing the groove width and without lowering the wear characteristics of the tire. Further, even when the pneumatic tire according to the present invention runs on a stony road, the tire will not seize stones at the tread side of the tire because the groove wall angle $\alpha_{25}$ of the outer region of the main groove 21 is sufficiently larger (32 degrees). Furthermore, even where a stone is seized by and pushed into the groove, the stone does not cut into the tread rubber to cause a fault. Rather it is discharged out of the groove because the groove wall angle $\alpha_{26}$ (37 degrees) of the inner region 26 is selected to be larger than the groove wall angle $\alpha_{25}$ (32 degrees) of the outer region 25.

To confirm the superiority of operation of a tire using a groove in accordance with the invention, two kinds of test tires (tubeless, size 11R22.5) for a test of the embodiment and for a comparative example.

Figure 2:
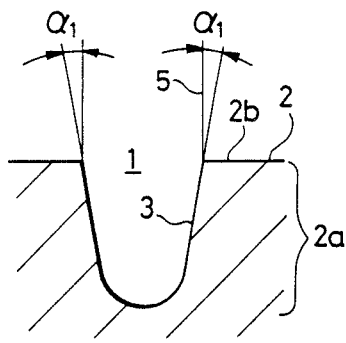
FIG.2 is a sectional view illustrating a main groove portion of a conventional pneumatic tire.
Figure 5:
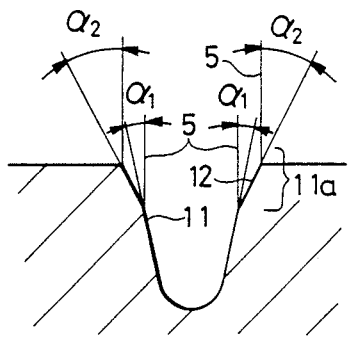
FIG. 5 is a section showing a main portion of another conventional pneumatic tire.

The test tire for the embodiment was that shown in FIG. 1 and the test tire as the comparative example was the conventional one shown in FIG.2, each tire having the groove depth of 23 mm, the groove width of 16 mm, and the groove wall angle $\alpha_1$ of 13 degrees. But the main groove construction, the tires were the same.

The test was performed in such a manner that the test tires were attached on a drive shaft of a semitrailer and the semitrailer was driven on an ordinary road (80% of a paved road and 20% of a gravel road). The numbers of stones seized by the grooves of the test tires were examined after 50,000 kilometers running (30% of wearing-out ratio of the tread) and after 150,000 kilometers running (85% of wearing-out ratio of the tread).

In the test after 50,000 kilometer-running, 60 pieces of stone seized in the groove were detected in the comparative example (conventional tire), while only 5 pieces of stone were detected in the tire of this embodiment. In the test after 150,000 kilometers running, 41 pieces of stone were seized in the groove in the comparative example (conventional tire) and 15 pieces of them caused such a fault that they cut into the tread rubber at the groove bottom to reach a belt layer. In contrast, only three pieces of stone were seized in the groove of the test tire of the embodiment without causing any fault.

As described above, in the tire according to the present invention, the lifetime thereof can be prolonged with the groove thereof made deeper, and the amount of stone-seizing by the groove can be significantly reduced so that tread peeling-off faults caused by stone-seizing can be prevented.

what is claimed is:

1. A pneumatic tire comprising; a tread having at least one circumferential main wide groove, said groove in cross-section having opposite side walls, one of said opposite side walls consisting of a straight outer wall region located at a radially outer portion of said one side wall, a straight inner wall region located at a radially inner portion of said one side wall, a straight intermediate wall region located between said inner and outer wall regions, groove wall angles $\alpha_{25}$, $\alpha_{26}$ formed between a line perpendicular to an outer surface of said tread and respective straight surface portions of said one side wall in said outer and inner regions selected to be larger than a groove wall angle $\alpha_{27}$ formed between said line and a surface portion of said one side wall in said intermediate region, and the other of said opposite side walls having a substantially linear face along the entire wall.

2. The pneumatic tire of claim 1 wherein the wall angle $\alpha_{26}$ of said inner wall region is larger than said wall angle $\alpha_{25}$ of said outer wall region.

3. The pneumatic fire of claim 1 wherein said wall angles $\alpha_{25}$ and $\alpha_{26}$ are in the range of 20° to 40°.

4. The pneumatic tire of claim 1 wherein the other of said opposite side walls is inclined to said line perpendicular to an outer surface of said tread at an angle substantially the same as the angle $\alpha_{27}$.

5. The pneumatic tire of claim 1 wherein said groove has a groove depth of 23 mm from said tread outer surface and a radial distance from said tread outer surface to a midpoint in said intermediate wall region is substantially 0.5 of the depth of said groove.

6. The pneumatic tire of claim 5 wherein the radial heights of said inner and outer wall regions are substantially equal.

7. The pneumatic tire of claim 1 wherein the ratio of groove width to groove depth is in the range of 0.5 to 0.8.

8. A pneumatic tire comprising; a tread having a main circumferential groove comprising in cross-section, a pair of asymmetrical side walls, one of said side walls consisting of a straight radially outer segment, a straight radially inner segment, and a straight radially intermediate segment, each straight segment having a different inclination to a line perpendicular to the tread surface, the inclination of said intermediate segment being less than the inclination of said radially inner and radially outer segments, and the other of said sidewalls having a substantially linear face along the entire wall.

9. The tire of claim 8 wherein said radially outer segment has an inclination smaller than the inclination of said radially inner segment.

10. The tire of claim 9 wherein the inclinations of said radially inner and outer segments are in the range of 20° to 40°.

11. The tire of claim 8 wherein said intermediate segment has a center line located at substantially 0.5 of the depth of said groove.

12. The tire of claim 8 wherein a ratio of groove width to groove depth is in the range of 0.5 to 0.8.

* * * * *